(12) United States Patent
Goldasz et al.

(10) Patent No.: US 9,500,253 B2
(45) Date of Patent: Nov. 22, 2016

(54) SHOCK ABSORBER SYSTEM AND METHOD

(75) Inventors: Janusz Goldasz, Cracow (PL); Thomas W. Nehl, Brighton, MI (US); Zbigniew Szklarz, Zator (PL)

(73) Assignee: BeijingWest Industries, Co., Ltd., Beijing (CN)

( * ) Notice: Subject to any disclaimer, the term of this patent is extended or adjusted under 35 U.S.C. 154(b) by 0 days.

(21) Appl. No.: 14/353,189

(22) PCT Filed: Dec. 31, 2011

(86) PCT No.: PCT/CN2011/085171
§ 371 (c)(1),
(2), (4) Date: Apr. 21, 2014

(87) PCT Pub. No.: WO2013/086761
PCT Pub. Date: Jun. 20, 2013

(65) Prior Publication Data
US 2014/0291092 A1    Oct. 2, 2014

Related U.S. Application Data

(60) Provisional application No. 61/570,324, filed on Dec. 14, 2011.

(51) Int. Cl.
*F16F 9/44* (2006.01)
*F16F 9/348* (2006.01)
*F16F 9/46* (2006.01)

(52) U.S. Cl.
CPC .......... *F16F 9/446* (2013.01); *F16F 9/3485* (2013.01); *F16F 9/464* (2013.01)

(58) Field of Classification Search
CPC ........ F16F 9/446; F16F 9/3214; F16F 9/348; F16F 9/3485; F16F 9/464
See application file for complete search history.

(56) References Cited

U.S. PATENT DOCUMENTS 3,587,963 A * 6/1971 Meulendyk ................ 236/92 R
5,522,484 A    6/1996 Sawai
(Continued)

FOREIGN PATENT DOCUMENTS

CN    202007854 U    10/2011
DE    102006049298 A1    5/2007
(Continued)

OTHER PUBLICATIONS

International Search Report, Sep. 7, 2012, 3 pages.
(Continued)

*Primary Examiner* — Anna Momper
(74) *Attorney, Agent, or Firm* — Dickinson Wright PLLC

(57) ABSTRACT

In shock absorber system 10, solenoid 18 varies the damping force by changing the position of spring seat 24, and the effective preload force, at the same time. In the normal, de-energized condition (with no current), damping forces are generated by the piston valve 30 including piston 20. The actuated valve spring 16 is relaxed and set in such a way that it applies only a minimum preload force to the rebound-side disc stack 28. The motion of the plunger 14, pin 32 and movable spring seat 24 assembly changes the spring force by varying the distance between the movable spring seat 24 and the stationary spring seat 22. In the energized state, applying current to coil 12 generates a pulling force on the plunger 14 in the direction of the core element 34 to attract plunger 14 towards the core 34 and across the initial gap 36 until it is in a direct contact with the core's surface 38. Maintaining plunger 14 at this position requires applying a continuous constant holding current to coil 12 so that the position of the plunger is preserved (and the high preload force at the same time). When current is no longer applied to the coil 12, then the pulling force is no longer generated, and the plunger assembly returns back to the original (soft) position due to the reverse action of the valve spring 16.

9 Claims, 4 Drawing Sheets

(56) References Cited

U.S. PATENT DOCUMENTS

| | | | |
|---|---|---|---|
| 5,551,541 A * | 9/1996 | F orster | 188/317 |
| 5,937,975 A * | 8/1999 | Forster | 188/266.6 |
| 8,950,559 B2 * | 2/2015 | de Kock | 188/282.8 |
| 8,997,952 B2 * | 4/2015 | Goetz et al. | 188/282.4 |
| 2002/0053652 A1 * | 5/2002 | Freisinger et al. | 251/30.03 |
| 2008/0116024 A1 * | 5/2008 | Heyn et al. | 188/322.13 |
| 2009/0127039 A1 | 5/2009 | Zeissner et al. | |
| 2013/0248750 A1 * | 9/2013 | Sauerbrey | 251/318 |

FOREIGN PATENT DOCUMENTS

| | | | | |
|---|---|---|---|---|
| EP | 0392784 A1 | 10/1990 | | |
| EP | 702166 A1 * | 3/1996 | | |
| EP | 1326030 A2 | 7/2003 | | |
| EP | 2505869 A2 * | 10/2012 | | |
| EP | 2770227 A2 * | 8/2014 | | F16F 9/464 |
| GB | 2227547 A | 1/1990 | | |
| WO | 2011063385 A1 | 5/2001 | | |
| WO | 2011063385 A1 | 5/2011 | | |

OTHER PUBLICATIONS

Supplementary European Search Report, Dated Oct. 7, 2015 6 Pages.
European Office Action issued on Mar. 29, 2016 for counterpart European patent application No. 11877253.2; 5 Pages.
European Communication Pursuant to Article 94(3) EPC Office Action; dated Sep. 21, 2016; 4 Pages.

* cited by examiner

SHOCK ABSORBER SYSTEM AND METHOD

CROSS REFERENCE TO RELATED APPLICATION

This application claims the benefit of PCT International Application Serial No. PCT/CN2011/085171 filed on Dec. 13, 2011 and entitled a "Shock Absorber System And Method", which claims benefit of U.S. Provisional Application No. 61/570,324 filed on Dec. 14, 2011 and entitled a "Shock Absorber System And Method".

FIELD OF THE INVENTION

The present invention relates to a shock absorber and method of operating a shock absorber system.

BACKGROUND OF THE INVENTION

Japanese patent 57-173630 discloses a solenoid actuator to vary the preload force in a piston valve. The force generated by the solenoid acts directly on the soft-magnetic spring seat which is a part of the solenoid's magnetic circuit. The solenoid-induced force opposes that of the main spring in the piston valve, i.e. it reduces it. The actuator controls extension (rebound) forces. The control can be continuous (step less).

The solenoid actuator generates a pulling force directly on the valve in order to decrease the preload force—the force imposed by the spring on the valve opposes the force generated by the actuator so that the effective preload force on the valve is the difference of the two forces (spring—actuator). The valve is a part of the magnetic circuit of the actuator to allow for that action. The seat is a geometric feature on the piston, i.e. it is fixed.

SUMMARY OF THE INVENTION

The present invention provides a shock absorber system in which a piston valve spring seat is fixed to a piston and an actuator generates a force directly on the valve increasing the preload force, characterised in that the spring seat is connected to, and for movement with, a moveable element of a solenoid, thereby to cause the position of a plunger to influence the preload force and so the rebound damping force of the shock absorber.

In this way, the solenoid varies the damping force in a shock absorber by changing the position of the spring seat, and the effective preload force, at the same time.

The system of the present invention may include any one or more of the following features:
- the plunger is energisable to a position in contact with the core, thereby to modify the separation between the movable and stationary valve seats;
- when the plunger is energised, the force applied is equal to the product of the spring stiffness ratio and the plunger displacement;
- two springs, one spring for applying a constant preload force to the discs in the piston assembly, and the other spring for providing the additional preload force in the energised mode;
- the two springs are co-axial with the constant preload force spring having a smaller diameter than the additional preload force spring;
- two parallel springs of which one is for applying a constant preload force to the discs in the piston assembly, and the other spring for providing the additional preload force in the energised mode;
- the other spring is operable to provide a preload variable according to the spring seat displacement.

The present invention also provides a method of operating a shock absorber system in which a piston valve spring seat is fixed to a piston and an actuator generates a force directly on the valve increasing the preload force, wherein the method is characterized by causing the position of a plunger to influence the preload force and so the rebound damping force of the shock absorber.

The method of the present invention may include any one or more of the following features:
- the preload force influence is operable by movement of a spring seat with a moveable element of a solenoid, the spring seat and the moveable element being connected;
- energising the plunger to a position in contact with the core, thereby to modify the separation between the movable and stationary valve seats;
- applying an additional preload force, when the plunger is energised, so that the preload force is a product of the actuated spring stiffness ratio and the plunger travel;
- one spring applies a constant preload force to the discs in the piston assembly, and another spring provides the additional preload force in the energised mode;
- two springs are co-axial with the constant preload force spring having a smaller diameter than the additional preload force spring;
- the other spring provides a preload variable according to the spring seat displacement.
- the two springs operate in parallel.

Thus the present invention involves a system in which the valve spring seat position is adjustable between two or more positions to cause a change in the pre-load force of the valve. It may be achieved preferably by an electromechanical action—connecting the spring seat to the movable part of a linear solenoid actuator, for example, a combination with a gear mechanism (linear-to-rotary).

Japanese patent 57-173630 shows a system in which the solenoid actuator generates a pulling force directly on the valve in order to decrease the preload force the force imposed by the spring on the valve opposes the force generated by the actuator so that the effective preload force on the valve is the difference of the two forces (spring—actuator). The valve is a part of the magnetic circuit of the actuator to allow for that action. The seat is a geometric feature on the piston, i.e. it is fixed.

In the present invention, the movable spring seat is not a part of the magnetic circuit. Neither is it in any direct contact with the discs. The actuator is external to the piston valve. The plunger in the actuator in connected to the spring seat via a connecting pin. The motion of the plunger (and the spring seat) generates an additional force on the discs that is equal to the spring stiffness ratio times the plunger travel. As an effect, the actuator influences the position of the spring seat on which one spring is located it is not used for acting directly on the discs as in the Japanese patent 57-173630.

Applications of the Present Invention

The present invention is applicable to shock absorber systems incorporating electromechanical solenoids, and also systems in which the motion of the spring seat can be accomplished by an electrical step motor, piezoelectric or magnetostrictive actuator or a combination of a motor/solenoid and gear mechanisms.

Advantages of the Present Invention

The present invention may provide any one or more of the following features:
- Control of extension (rebound) forces (two states) from low (soft) state to high (hard) state upon the application of the additional preload force to the disc stack;
- Possibility of using the type of actuation in a reverse way, i.e. from high rebound forces to low rebound forces by generating the additional force, i.e. subtracting from the total force acting on the disc stack);
- The actuating system including the spring is operated in parallel to the main valve. In this way, the actuating systems can be easily added to the main valve with few modification of the main valve's structure;
- Low-cost actuation with no expensive controls required in which the change in increasing the damping forces is achieved by modifying only one single valving control (variable), namely the preload force;
- High latching (holding) force at relatively low holding current with low current draw/power losses;
- Applicable to twin-tube and to mono-tube valves;
- A low-cost and low-energy monotube or twintube damper;
- A low-cost and low-energy generic bi-state piston valve for use on any damper platform.

BRIEF DESCRIPTION OF THE DRAWINGS

In order that the invention may more readily understood, a description is now given, by way of example only, reference being made to various embodiments of the present invention, in which.

DETAILED DESCRIPTION OF THE DRAWINGS

Figure 1:
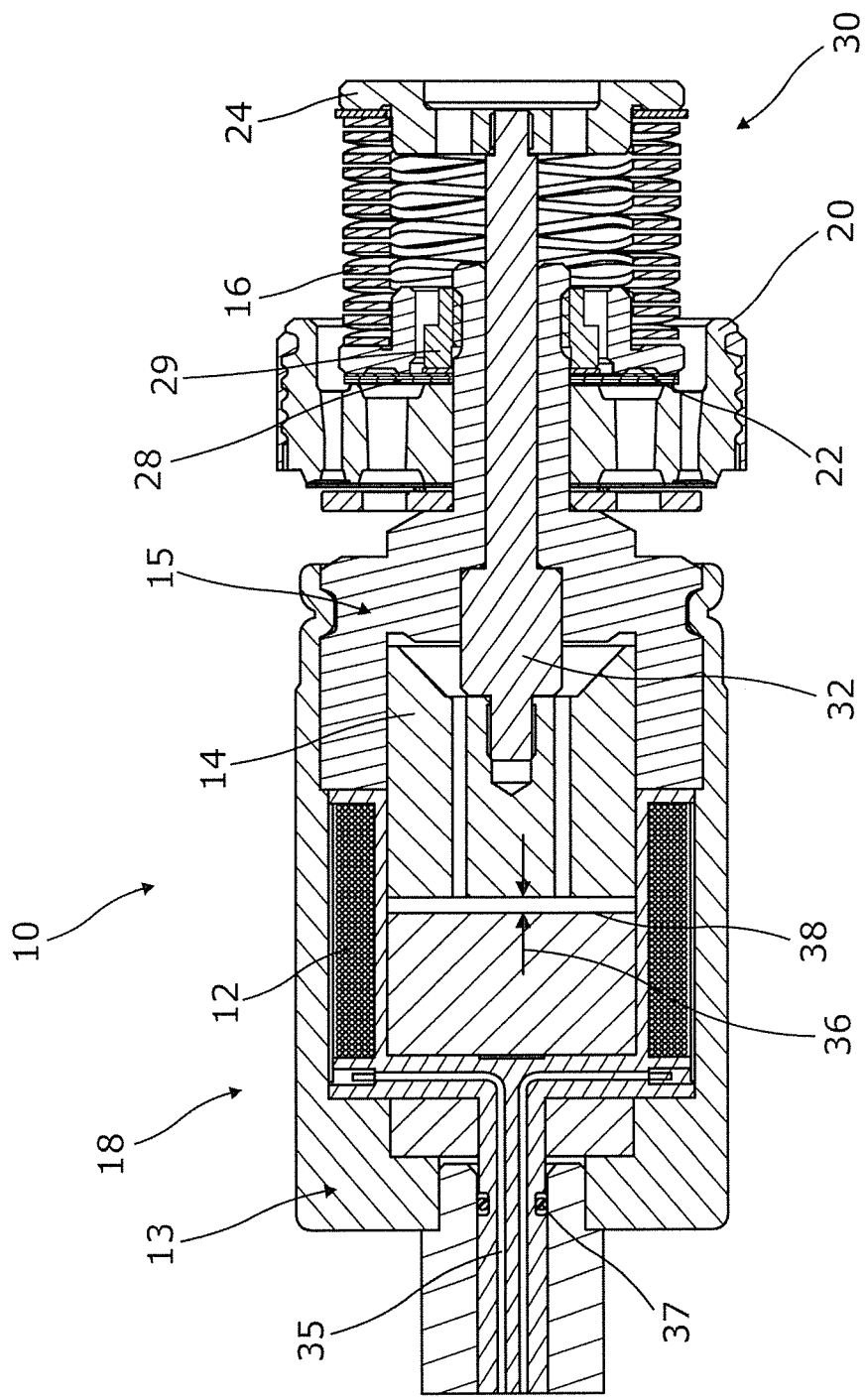
FIG. 1 is a cross-sectional view of a first embodiment of a shock absorber system of the present invention in a de-energised state.

There is shown in FIG. 1 a shock absorber system 10 of the present invention, in which the solenoid varies the damping force in a shock absorber by changing the position of the spring seat, and the effective preload force, at the same time.

The system 10 is normally in the soft mode (i.e. low damping forces) as shown in FIG. 1, and it switches into the so-called hard mode (i.e. high damping forces) by applying a current to coil 12 and hence generating a pulling force on plunger 14 located within tenon 15. An actuated spring 16 pushes the system 10 back into the original position once solenoid 18 incorporating coil 12 ceases to operate.

Thus, in the normal, de-energized condition (with no current applied to the actuator's coil 12), the rebound damping forces in the damper are generated by the piston valve 30 (including piston 20). The actuated valve spring 16 (between the stationary spring seat 22 and movable spring seat 24) is set in such a way that it applies minimum preload force to the rebound-side disc stack 28 secured by clamping nut 29. The movable spring seat 24 is rigidly connected to the plunger 14 component of the actuator 30 via connecting pin 32. The motion of the assembly incorporating plunger 14, pin 32 and the movable spring seat 24 changes the spring force on the spring seat 22 by varying the distance between the movable spring seat 24 and the stationary spring seat 22.

Figure 2:
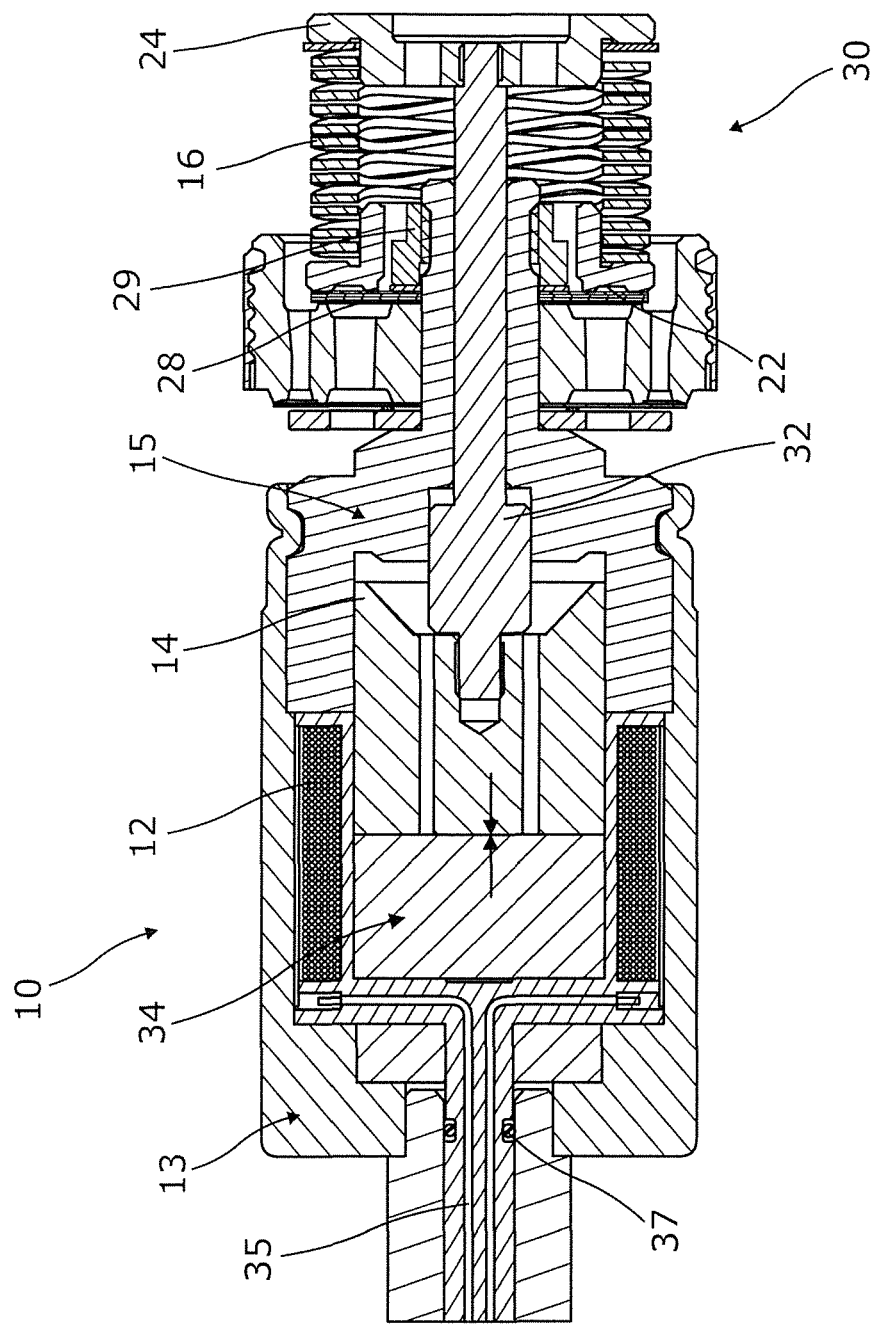
FIG. 2 is across-sectional view of the system of FIG. 1 in an energised state.

FIG. 2 shows system 10 in the energized state, wherein applying current to coil 12 through the connecting wires 35 in the solenoid 18 generates a pulling force on the plunger 14 in the direction of the core element 34. As a result, the plunger 14 is attracted towards the core 34, and travels across the initial gap 36 until it is in a direct contact with the core's surface 38. Maintaining plunger 14 at this position requires applying a continuous holding (or latching) constant current to coil 12 so that the plunger position is preserved. Holding the plunger in this position requires a constant current that is substantially lower than the current required to pull the plunger 14 (and the connected seat 24) towards the core 34. Displacing the plunger 14 by the initial gap 36 between the plunger's static position (shown in FIG. 1) and the core's lower surface 38 modifies the distance between the spring seat 22 and the movable spring seat 24 (that is rigidly connected to plunger 14) so that an additional preload force can be applied to the disc stack 28. Again, the force is equal to the actuated spring stiffness ratio times the plunger travel.

Solenoid 18 is provided with a sealing O-ring 37 to prevent oil leakage.

When current is no longer applied to the coil 12, then the pulling force is no longer generated, and the plunger assembly returns back to the original (soft) position due to the reverse action of the valve spring 16.

Figure 3:
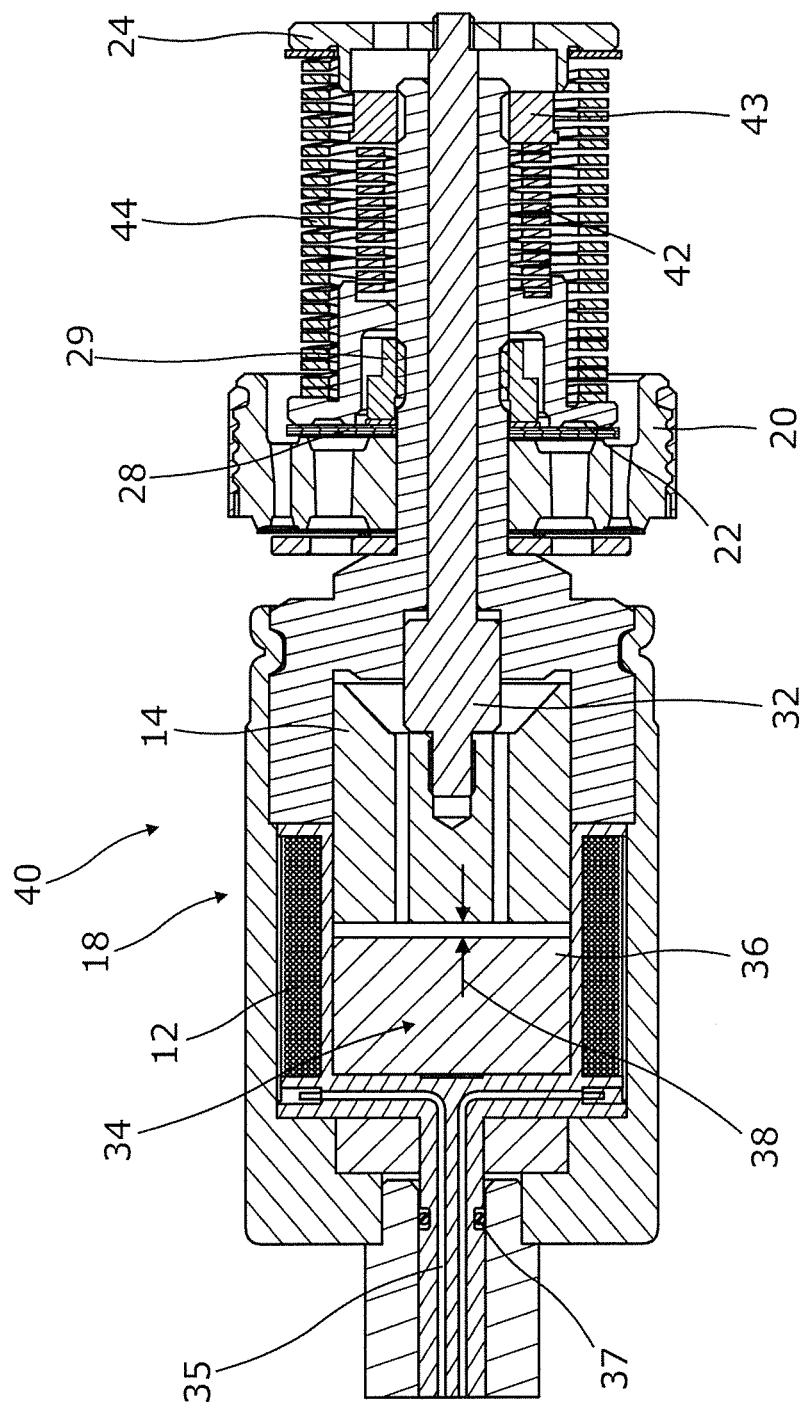
FIG. 3 is a cross-sectional view of a second embodiment of a shock absorber system of the present invention in a de-energised state.
Figure 4:
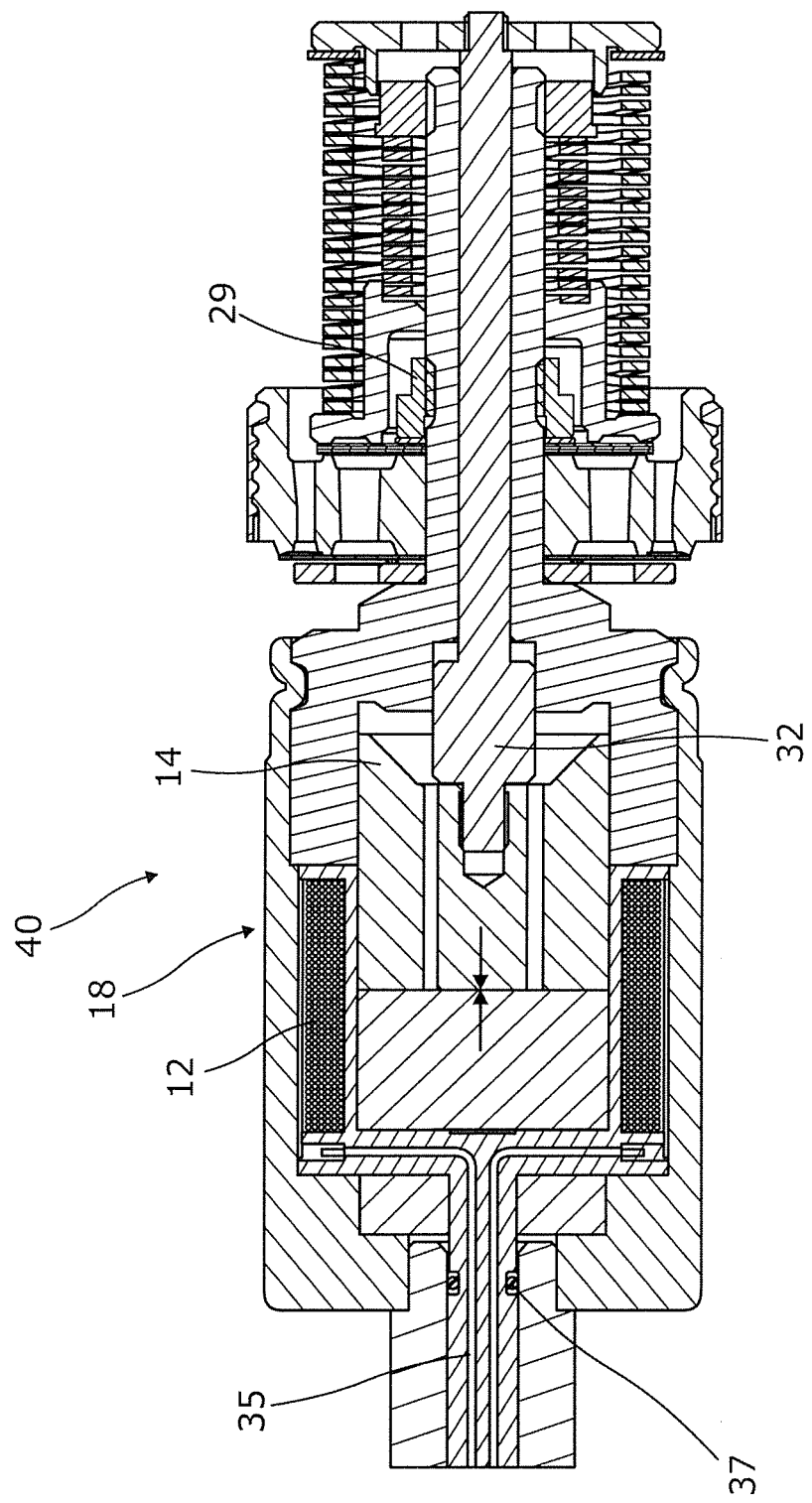
FIG. 4 is a cross-sectional view of the system of FIG. 3 in an energised state.

FIGS. 3 and 4 show a second embodiment of the present invention (such that the same reference is used as that in the previous embodiment when the feature is the same) wherein a shock absorber system 40 is generally similar to system 10 with a principal difference being the use of two parallel springs, of which the inner (smaller diameter) spring 42 (secured by nut 43) applies a constant preload force to the discs in the piston assembly, and the outer (larger diameter) spring 44 provides the additional preload force on the discs that is generated by displacing the (movable) spring seat 24 (once the pulling force is generated by solenoid 18 and plunger 14 is attracted to the core 34). In the de-energized position (FIG. 3), outer spring 44 is relaxed and set in such a way that it applies only a minimum preload force to the spring seat 22 (and the disc stack 28 with which it is in contact).

The presence of a preload force results in a threshold initial pressure on the disc stack 28 that needs to be overcome by the fluid so that it is allowed to flow through piston valve 30 incorporating piston 20, and disc stack 28. By varying the initial pressure between two distinct states, two different damping force characteristics can be generated in a shock absorber.

In either embodiment, the actuator's sleeve 13, core 34, plunger 14, tenon 15 are preferably made of soft-magnetic (low carbon steel) alloys. The connecting pin is preferably made of an austenitic (non-magnetic) stainless steel grade or a material of similar non-magnetic properties.

The above illustrated embodiments incorporate a two-position conventional solenoid 18. The present invention is also applicable to systems incorporating stepless operation in which the position of the spring seat 24 is maintained anywhere in the gap defined by the position of the spring seat 24 in the de-energised condition and the position of the plunger 24 in the fully energized condition (i.e. with the plunger 14 contacting the core element 34).

In one variant of the invention, the "Reverse" operation mode, the default state for this actuator (in the absence of the pulling force of the actuator) is the so-called soft state (low force) in which the plunger 14 (facing the core's surface 38) is at a certain distance from the core 34 (and the spring 16 on the movable spring seat 24 is relaxed as well). Only upon the application of the current is the plunger pulled toward the core, thus changing the spring preload force acting on the discs. This can be changed by designing an actuator in such a way that the default state is the hard state in which the movable spring 16 is initially compressed (at no current conditions) so that the maximum preload force on the disc stack 28 is achieved.

In another variant, the spring assembly acts on the rebound-side (extension) valves below the piston 20. This can be changed by moving the spring assembly (incorporating the spring 16, the movable spring seat 24 and the connecting pin 32) to the other side of the piston, and re-designing the actuator so that it varies on the preload force on the (compression-side) discs above the piston.

What is claimed is:

1. A shock absorber system comprising:
   a piston including a deflected disk stack assembly;
   a stationary spring seat disposed in abutting relationship with said deflected disk stack assembly;
   a movable spring seat disposed in spaced relationship to said stationary spring seat to define a distance extending therebetween;
   a valve spring extending between said stationary spring seat and said movable spring seat to establish a preload force on said deflected disk stack assembly;
   said movable spring seat connected to a plunger of a solenoid and movable towards said stationary spring seat in response to an energized condition of said solenoid to decrease said distance between said movable spring seat and said stationary spring seat and increase the preload force on said deflected disk stack assembly;
   a connecting pin rigidly connecting said movable spring seat to said plunger;
   said solenoid further including a coil disposed about said plunger for providing said energized condition of said solenoid;
   said plunger extending past said coil toward said movable spring seat; and
   said shock absorber system further comprising an inner spring secured to a tenon disposed in surrounding relationship with said plunger, said inner spring biased against said stationary spring seat for applying a constant preload force to said deflectable disc stack assembly.

2. A system according to claim 1 wherein said plunger is movable to a position in contact with a core of said solenoid when said solenoid is in the energized condition.

3. A system according to claim 1 wherein, when the solenoid is in the energized condition, the preload force applied to said deflected disc stack assembly is a product of stiffness ratio of said valve spring and a decrease in the distance between said movable spring seat and said stationary spring seat.

4. A system according to claim 1 said valve spring and said inner spring are co-axial with said inner spring having a smaller diameter than said valve spring.

5. A method of operating a shock absorber system including a piston having a deflected disk stack assembly, comprising:
   fixing a valve spring between a stationary spring seat disposed in abutting relationship with the deflected disk stack assembly and a movable spring seat rigidly connected to a plunger of a solenoid via a connecting pin to establish a preload force on the deflected disk stack assembly;
   disposing a coil of the solenoid about the plunger with the plunger extending past the coil toward the movable spring seat;
   energizing the coil of the solenoid to generate a pulling force directly on the plunger and decrease a distance between the movable stationary spring seat and the stationary spring seat to increase the preload force on the deflected disk stack; and
   said method further comprising fixing an inner spring to a tenon disposed in surrounding relationship with the plunger and biasing the inner spring against the stationary spring seat to apply a constant preload force to the deflected disk stack assembly.

6. A method according to claim 5 wherein the energizing of the solenoid disposes the plunger in a position in contact with a core of the solenoid.

7. A method according to claim 5 wherein the preload force is a product of a stiffness ratio of the valve spring and a decrease in the distance between the movable spring seat and the stationary spring seat.

8. A method according to claim 5 wherein the inner spring and the valve spring are co-axial with the inner spring having a smaller diameter than the valve spring.

9. A method according to claim 8 wherein the inner spring and the valve spring operate in parallel.

* * * * *